3,067,182
ISOPROPENYLBENZYL CHLORIDE AND POLYMERS THEREOF

Giffin D. Jones, Midland, Mich., assignor to The Dow Chemical Company, Midland, Mich., a corporation of Delaware
No Drawing. Filed Aug. 3, 1959, Ser. No. 830,993
5 Claims. (Cl. 260—87.5)

This invention relates to para-isopropenylbenzyl chloride, mixtures of meta- and para-isopropenylbenzyl chloride, polymers thereof and to a method of making the same.

Mixed isomers of isopropenylbenzyl chloride can be prepared by dehydrohalogenating mixed isomers of chloroisopropylbenzyl chloride under the influence of heat and preferably in the absence of polymerization catalysts, both of peroxide and Friedel-Crafts type. The reaction vessel may be of glass or nickel construction or, if coated, iron can be used but is not recommended. Dehydrohalogenation may be accomplished at any temperature from about room temperature to about 250° C., although temperatures of about 150° to about 200° C. are preferred for large scale operations with contact times of less than one hour. In such an operation the pressure may be kept between 90 and 180 millimeters and the monomer distilled at 170° to 190° C. without reflux and with no fractionation. Above 200° C. a considerable amount of polymerization takes place whereas below 150° C. the dehydrohalogenation is quite slow, although entirely feasible especially for small scale operations, i.e. laboratory preparations.

The mixed isomers may be purified and partially separated by fractional distillation at reduced pressures such as, for example, fractionally distilling at from about 80° to about 85° C. at from about 2 to about 3.0 millimeters' pressure. The para-isomer, having a melting point of 28° C., may be purified by fractional crystallization at reduced temperatures.

Chloroisopropylbenzyl chloride may be prepared by chloromethylating isopropylbenzene followed by side chain chlorination as shown in the following series of reactions:

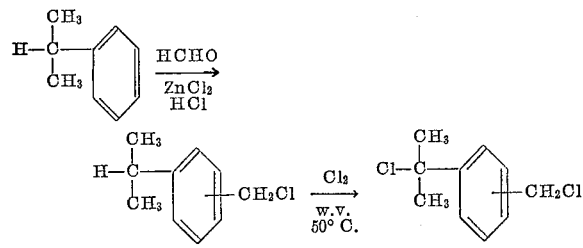

Alternatively, the individual isomers, of meta- and para-isopropenyl toluene, or mixtures of these isomers, may be treated with HCl and the saturated product treated with a hypochlorite, such as t-butyl hypochlorite, to produce the chloroisopropylbenzyl chloride which can then be fractionally distilled to yield the desired products.

The compounds of the present invention are useful in the preparation of unsaturated quaternary ammonium compounds by reaction with tertiary amines, and are useful in the preparation of new polymers and copolymers. They may be copolymerized under the influence of free radical initiators in bulk, aqueous suspension or emulsion with styrene or vinyltoluene in the ratio of 30 mole percent isopropenylbenzyl chloride and the resulting copolymers converted to water solubility by treatment with trimethylamine. This copolymer can be used as a precipitant to remove high molecular weight acids such as ligno-sulfuric acid from water solution.

These new compounds polymerize readily under the influence of ionic polymerization catalysts such as, for example, boron trifluoride, stannic chloride, aluminum chloride, and titanium tetrachloride.

Monomeric isopropenylbenzyl chloride copolymerizes readily with one or more other ethylenically unsaturated monomers such as, for example, isobutylene, butadiene, styrene, acrylonitrile, vinylidene chloride, and the like. In copolymerization catalyzed by peroxides or radiation, for example with butadiene, acrylonitrile and the like, there are formed initially soluble and thermoplastic copolymers which progressively become less soluble and less plastic as a higher mole percent of isopropenylbenzyl chloride is incorporated in the polymer product. Solubility can be retained by use of a small amount of a mercaptan or other modifier during the polymerization with monomers such as, for example, butadiene, styrene, acrylonitrile, vinylidene chloride, and the like.

Isopropenylbenzyl chloride has the unique property of copolymerizing with isobutylene under ionic copolymerization conditions at such a rate that the monomer ratio in the polymer product is nearly the same as the monomer ratio in the feed. For example, when a mixture of 0.91 mole percent of isopropenylbenzyl chloride and 99.09 mole percent isobutylene was polymerized at −125° to −109° C. in the presence of boron trifluoride to 53.5 percent completion, the polymer product contained 1.31 mole percent of isopropenylbenzyl chloride. In contrast, when a mixture of 5.0 mole percent of vinylbenzyl chloride and 95.0 mole percent of isobutylene was polymerized at −100° C. in the presence of boron trifluoride to 47.0 percent completion, the polymer product contained only 0.38 mole percent of vinylbenzyl chloride. Copolymers of isobutylene and vinylbenzyl chloride of greater uniformity can be prepared by polymerizing at higher temperatures, but the molecular weight of the resulting polymer is lower. For example, by copolymerizing vinylbenzyl chloride and isobutylene at −60° C. an appreciably more uniform copolymer is obtained but the molecular weight is too low for good rubber properties. Uniform copolymers of vinylbenzyl chloride and isobutylene can be obtained at very low conversions. However, if the conversion is as much as 10 percent, for example, a monomer mixture containing 9.6 mole percent vinylbenzyl chloride yields a copolymer containing only 2.0 mole percent vinylbenzyl chloride. It is also possible to obtain uniform copolymers of vinylbenzyl chloride and isobutylene through maintaining a constant monomer composition by continuous addition, but this procedure is difficult and exacting to carry out. The unique advantage of isopropenylbenzyl chloride in making uniform copolymers with isobutylene is thus readily apparent.

The copolymers of isopropenylbenzyl chloride and isobutylene are readily cross-linked with amines such as, for example, diethylenetriamine, triethylenetetramine, hexamethylenediamine, ethylenediamine, piperazine, monomethylamine, 3,3'-diaminodipropylamine, and the like. Amination may be carried out in various ways, such as, for example, by adding the amine to a 10 percent solution of the copolymer in toluene, adding the amine to the copolymer on the rolls and compounding, adding the amine to the toluene solution with a small amount of ethanolic potassium hydroxide, or by suspending a film of the copolymer in an alcoholic solution of potassium hydroxide and slowly adding the amine.

Due to the presence of chloromethyl groups in copolymers of isopropenylbenzyl chloride, said copolymers may be cured with phenols or by merely adding a Friedel-Crafts catalyst to obtain cure by self-alkylation.

The present invention may be further illustrated, but is not to be construed as limited, by the following examples:

*Example I.—Preparation of Isopropenylbenzyl Chloride*

Isopropylbenzyl chloride (89 percent para-, 11 percent ortho-) was chlorinated batchwise at 50° C. under ultraviolet light until the density reached 1.12. This material was then fractionally distilled and the unchlorinated material recycled. The distilled fraction having a density range of 1.051 to 1.092 was refractionated using a 3-foot Vigreux column and a 10:1 reflux ratio. The material boiling at 73° to 74° C. at 0.01 to 0.05 millimeters' of mercury pressure absolute (receiver) contained 83 to 84 percent isopropenylbenzyl chloride, which was further purified by filtering at the freezing point (28° C.) to obtain a solid product of 96 percent purity.

*Example II.—Meta- and Para-Isopropenylbenzyl Chloride and Polymers Thereof*

A mixture of meta- and para-isopropenyltoluene (55 percent meta) (230 g.) was treated with 20 milliliters concentrated hydrochloric acid and held below 5° C. while hydrogen chloride was bubbled in. After four hours, the unsaturation determination indicated that the isopropenyltoluene content had dropped to 5.3 percent. By 6 hours, it was 4.8 percent and after 9 hours it was 3 percent. At this time, the oil layer after washing with water had a specific gravity at 25° of 1.023.

A mixture of 105 grams of this hydrochlorinated isopropenyltoluene and 68 grams t-butyl hypochlorite was refrigerated 12 days at 4° C., and 88 grams of mixture which had lost the hypochlorite odor, was distilled at 0.3 mm. perssure. The portion boiling between 75° and 88° C. amounted to 15.5 grams and was about 25 percent isopropenylbenzyl chloride by unsaturation determination.

To increase the degree of unsaturation, 11 grams of this portion was heated to 150° C. for a half hour and to 190° C. for 5 minutes. It had been treated with 0.5 gram dinitro-ortho-cresol, but nevertheless some polymer formed.

The sample now was 50.4 percent isopropenylbenzyl chloride by unsaturation determination. A 6.0 gram portion was diluted with dry hexane and the solution washed with 10 percent caustic to remove the inhibitor. A small amount of polymer which was insoluble in the hexane was removed. The hexane solution (45 milliliters) contained 7.55 percent or 3.4 grams isopropenylbenzyl chloride by unsaturation determination. This solution, dried with calcium chloride, and 32 grams isobutylene, dried with caustic and Ascarite, were dissolved in 375 grams ethyl chloride which had been dried with Drierite. The solution was cooled to −100° C. with a liquid nitrogen-ethyl chloride bath and boron trifluoride gas introduced from a gas burette. After the addition of 43 milliliters there was an exothermic polymerization, the temperature rising to −85° at the peak before cooling again. Further addition of boron trifluoride caused no further temperature rise. The catalyst was deactivated with aqueous acetone and the solution allowed to warm up overnight. The polymer was precipitated with methanol as a soft taffy. It was twice dissolved in toluene and precipitated in methanol and dried, first in a vacuum oven at 50° C. and then in a vacuum desiccator at room temperature. A 35 gram yield of a sticky rubber was obtained. A test portion of the combined liquor from the polymer precipitations was evaporated and found to contain 2.5 mg. of solids per milliliter or 1.6 grams altogether.

This copolymer contained 3.43 mole percent isopropenylbenzyl chloride. The intrinsic viscosity in toluene was 0.436; the 10 percent viscosity, 8.9 centipoises.

*Example III.—Preparation of Para-Isopropenylbenzyl Chloride*

A mixture of 1183 grams of p-cymene and 25 milliliters of syrupy phosphoric acid was placed in a glass vessel fitted with a Pyrex light well containing a H 100–A4 G.E. lamp, and cooled to 0° C. The temperature was maintained at between 0° and 20° C. while 1130 grams of chlorine were sparged in. The product was washed with water and 1732 grams of oil separated which was fractionally distilled through a Vigreux column, 3-feet long and 1 inch in diameter. The first cut was distilled at 5 millimeters and the other cuts at about 2 millimeters of mercury pressure absolute.

| Cuts | Grams | Main constituent | B.P., ° C. (Corrected to atmospheric pressure) |
|---|---|---|---|
| 1–2 | 167 | Isopropenyltoluene | 190 |
| 4–9 | 566 | Isopropylbenzyl Chloride | 232 |
| 10–13 | 186 | Isopropenylbenzyl Chloride (69.5 weight percent) | 248 |

The fractions were identified on the basis of boiling point, density, and unsaturation (bromate-bromide).

*Example IV.—Copolymerization of Isopropenylbenzyl Chloride and Isobutylene*

A charge of 22 grams (0.13 mole) of 88 percent pure isopropenylbenzyl chloride, 66 grams (1.2 moles) of isobutylene and 300 milliliters of ethyl chloride was placed in a vessel and stirred and cooled to −120° C. with a liquid nitrogen-ethyl chloride bath. Boron trifluoride gas was metered into the stirred mixture at room temperature. In the first 8 minutes 31 milliliters of $BF_3$ were introduced with little rise in temperature. In the next 14 minutes, 22 milliliters of $BF_3$ were introduced and the temperature rose to −110° C. Over the next 8 minutes, 12 more milliliters of $BF_3$ were added and the temperature rose to −90° C. The reaction was continued for 12 minutes without catalyst addition and the temperature dropped to −95° C. Aqueous acetone was used to "kill" the reaction. The product was a sticky mass which was washed with methanol, dissolved in toluene and reprecipitated in methanol, filtered and dried in a vacuum oven at 50° C. to give a tough elastic rubber. The product weighed 80 grams representing a yield of 94 percent. This material had a chlorine content of 6.58 percent and a viscosity of 12.1 centipoises in a 10 percent solution in toluene. This copolymer contained 13 mole percent of isopropenylbenzyl chloride.

*Example V.—Curing Isopropenylbenzyl Chloride-Isobutylene Copolymers*

An isopropenyl benzyl chloride-isobutylene copolymer containing 3.79 mole percent of the first monomer and having a viscosity of 44.12 centipoises (10 weight percent in toluene) was heated at 160° C. for 20 minutes, cooled to room temperature and then found to have an ultimate tensile strength of 97 p.s.i. and an ultimate elongation of 2300–2600 percent. An uncured sample was milled at room temperature with 5 parts zinc oxide, 2 parts stearic acid, 1.2 parts sulfur, 1.5 parts tetramethylthiuram disulfide, 1.0 part mercaptobenzothiazole and 25 parts of easy process channel Spheron 9 carbon black and the resulting mixture cured for 20 minutes at 160° C. The ultimate tensile strength at room temperature was 807 p.s.i. and the ultimate elongation was 94 percent. When 50 parts of Spheron 9 were used instead of 25 parts the ultimate tensile strength at room temperature was 930 p.s.i. and the elongation 93 percent.

As previously stated, isopropenylbenzyl chloride can be polymerized to form solid products which are soluble in organic solvents, e.g. toluene, methyl ethyl ketone, ethylidene dichloride, etc., or copolymerized with other unsaturated vinyl or vinylidene compounds such as styrene, methyl methacrylate, methyl isopropenyl ketone, isobutylene, and the like, to yield resinous products. These products can be extruded or molded in usual ways employing conventional procedures to form shaped articles such as boxes, plates, or plastic tags. They can also be incorporated with other resinous polymers to form compositions useful for making shaped articles, e.g. cups, tags, rings, etc.

Various modifications may be made in the present invention without departing from the spirit or scope thereof, and it is understood that I limit myself only as defined in the appended claims.

I claim:

1. A substantially uniform, vulcanizable copolymer of from about 1 to about 30 mole percent of isopropenylbenzyl chloride and from about 99 to about 70 mole percent of isobutylene.

2. Copolymer of claim 1, wherein the isopropenylbenzyl chloride is the para isomer.

3. A substantially uniform, vulcanized rubbery product containing a major proportion of a copolymer of isopropenylbenzyl chloride and isobutylene.

4. A method of copolymerizing isopropenylbenzyl chloride comprising contacting the isopropenylbenzyl chloride and isobutylene with a Friedel-Crafts catalyst in an inert solvent at a temperature below about −50° C.

5. A method for making isopropenylbenzyl chloride comprising contacting hydrochlorinated isopropenyltoluene with t-butyl hydrochlorite at a temperature below room temperature but above the melting point of the hydrochlorinated isopropenylytoluene-t-butyl hypochlorite mixture.

References Cited in the file of this patent

UNITED STATES PATENTS

| | | |
|---|---|---|
| 2,557,094 | Garber | June 19, 1951 |
| 2,561,796 | Hollyday | July 24, 1951 |
| 2,773,052 | Cohen et al. | Dec. 4, 1956 |
| 2,780,604 | Clarke et al. | Feb. 5, 1957 |
| 2,950,503 | McRae | Aug. 30, 1960 |